United States Patent [19]

Umeda

[11] Patent Number: 4,663,723

[45] Date of Patent: May 5, 1987

[54] DEMAND ESTIMATION APPARATUS

[75] Inventor: Yasukazu Umeda, Kasugai, Japan

[73] Assignee: Mitsubishi Denki Kabushiki Kaisha, Tokyo, Japan

[21] Appl. No.: 536,319

[22] Filed: Sep. 27, 1983

[30] Foreign Application Priority Data

Oct. 19, 1982 [JP] Japan .............................. 57-183313

[51] Int. Cl.[4] .......................... H02J 4/00; B66B 1/00

[52] U.S. Cl. .................................. 364/492; 187/125; 364/493; 364/151

[58] Field of Search .............. 364/492, 493, 436, 149, 364/151; 187/29 R

[56] References Cited

U.S. PATENT DOCUMENTS

| | | | |
|---|---|---|---|
| 3,385,402 | 5/1968 | Burgy et al. | 187/29 R |
| 3,593,825 | 7/1971 | Gieseler | 187/29 R |
| 4,030,572 | 6/1977 | Kaneko et al. | 187/29 R |
| 4,044,860 | 8/1977 | Kaneko et al. | 187/29 R |
| 4,081,059 | 3/1978 | Kuzunuki et al. | 187/29 R |
| 4,125,782 | 11/1978 | Pollnow, Jr. | 364/493 X |
| 4,141,069 | 2/1979 | Fox | 364/493 |
| 4,153,936 | 5/1979 | Schmitz et al. | 364/493 |
| 4,193,478 | 3/1980 | Keller et al. | 187/29 R |
| 4,347,576 | 8/1982 | Kensinger et al. | 364/493 |
| 4,411,338 | 10/1983 | Kuzunuki et al. | 187/29 R |
| 4,418,795 | 12/1983 | Trosky et al. | 364/436 |
| 4,448,286 | 5/1984 | Kuzunuki et al. | 187/29 R |
| 4,458,787 | 7/1984 | Uetani | 187/29 R |
| 4,473,134 | 9/1984 | Uetani | 187/29 R |
| 4,524,418 | 6/1985 | Araya et al. | 187/29 R X |
| 4,542,463 | 9/1985 | Uetani | 187/29 R |

*Primary Examiner*—Gary Chin
*Assistant Examiner*—Joseph L. Dixon
*Attorney, Agent, or Firm*—Leydig, Voit & Mayer

[57] ABSTRACT

A demand estimation apparatus for controlling machines wherein each cycle of a demand fluctuating substantially cyclically is divided into a plurality of sections in which a processor operated under program control sets temporary boundary times of a current cycle on the basis of measured demands during the current cycle and estimated demands for corresponding sections of a previous cycle, and corrects the estimated boundary times set at the end of a previous cycle in accordance with the temporary boundary times determined for the current cycle in such a manner that the total demands in all the sections are equal or have another predetermined relationship.

9 Claims, 9 Drawing Figures

DEMAND ESTIMATION APPARATUS

BACKGROUND OF THE INVENTION

This invention relates to improvements in a demand estimation apparatus for estimating a demand such as the traffic volume of elevators in a building and the electric power load of a power station.

The traffic volume of elevators in a building, the electric power load of a power station, or the like (hereinbelow, termed "demand") fluctuate irregularly when closely observed within a period of one day, but remain substantially constant for the same time zones when observed over several days. For example, in an office building, the first floor is often crowded with elevator passengers on their way to their office floors during a short period of time in the morning. In the first half of the lunch hour, many passengers may go from their office floors to a restaurant floor or the first floor, while in the latter half thereof, many passengers may go from the restaurant floor and the first floor to the office floors. On the other hand, at the end of the day the passengers go from their office floors to the first floor when they leave the building. The volume of traffic in the up direction in the morning is nearly equal to the volume of traffic in the down direction in the evening and the volume of traffic becomes very small throughout the night.

In order to deal with the changing traffic in a building with a limited number of elevators, the elevators are usually operated under group supervision. When a hall call is registered anew, an elevator is tentatively assigned to serve this hall call so that the waiting times of all hall calls and the possibility of the full capacity of passengers are predicted to determine service evaluation values for corresponding elevators. In order to execute the demand estimation process, certain traffic data pertaining to the operation of the elevators in the building is required. For example, data on the number of passengers who get on and off each elevator cage at the intermediate floors is required for predicting the possibility of full capacity. However, it is impractical to constantly store such traffic data every short moment since an enormous memory capacity is necessitated. Usually, the required memory size is reduced by dividing the operating period into several time zones, and only the average traffic volume in each time zone is stored. On the other hand, traffic data in a building may also change as a result of changes in personnel organization in the building, and hence, it is difficult to obtain good traffic data from which the demand can be predicted accurately. For this reason, a system has been developed, for example, as disclosed in copending application Ser. No. 473,359 and U.S. Pat. No. 4,524,418, wherein traffic conditions in the building are continuously detected so as to sequentially improve the traffic data.

More specifically, the operating period of one day is divided into K time zones (hereinbelow, termed "sections"), and a time (hereinbelow, termed "boundary time") by which a section k−1 and a section k are bounded is denoted by $t_k$ (k=2, 3, . . . K). Times $t_1$ and $t_{K+1}$ are the starting time and end time of the elevator operation, respectively. The average traffic volume $P_k(l)$ of the section k on the l-th day is supposed to be given by the following equation (1):

$$P_k(l) = \frac{1}{t_{K+1} - t_K}\begin{bmatrix} X_k{}^u(l) \\ X_k{}^d(l) \\ Y_k{}^u(l) \\ Y_k{}^d(l) \end{bmatrix} \quad (1)$$

Here, $X_k{}^u(l)$ is a column vector of F−1 dimensions (where F denotes the number of floors) the elements of which are the number of passengers to get on cages in the up direction at respective floors in the time zone k of the l-th day. Similarly, $X_k{}^d(l)$, $Y_k{}^u(l)$ and $Y_k{}^d(l)$ are column vectors which indicate the number of passengers to get on the cages in the down direction, the number of passengers to get off the cages in the up direction and the number of passengers to get off the cages in the down direction, respectively. The average traffic volume (hereinbelow, termed "average demand") $P_k(l)$ is measured by a passenger-number detector which utilizes load changes during the stoppage of the cages of the elevators and/or industrial television, ultrasonic wave, or the like.

First, it will be considered to sequentially correct the respresentative value of the average demand $P_k(l)$ of each time zone in a case where the boundary time $t_K$ is fixed.

It is known that the columns $P_k(1)$, $P_k(2)$, . . . of the daily average demands will disperse in the vicinity of a certain representative value $P_k$. Since the magnitude of the representative value $P_k$ is unknown, it needs to be estimated. In this case, there is the possibility that the magnitude itself of the representative value $P_k$ will change. The representative value is therefore predicted by taking a linear weighted average given in Equations (2) and (3) below and applying more weight to the average demand $P_k(l)$ measured latest, than to the other average demands $P_k(1)$, $P_k(2)$, . . . , $P_k(l-1)$.

$$\hat{P}_k(l) = (1-a)^l P_k(0) + \sum_{i=1}^{l} \lambda_i P_k(i) \quad (2)$$

$$\lambda_i = a(1-a)^{l-i} \quad (3)$$

Here, $\hat{P}_k(l)$ is a predicted representative value determined from the average demands $P_k(1)$, . . . , $P_k(l)$ measured up to the l-th day, and $P_k(0)$ is an initial suitable value set in advance. $\lambda_i$ denotes the weight of the average demand $P_k(i)$ measured on the i-th day, and this weight changes depending upon a parameter a. More specifically, an increase in the value of the parameter a results in an estimation in which more weight is applied to the latest measured average demand $P_k(l)$ than to the other average demands $P_k(1)$, . . . $P_k(l-1)$, and in which the predicted representative value $\hat{P}_k(l)$ quickly follows up the change of the representative value $P_k$. However, when the value of the parameter a is too large, the predicted representative value drastically changes in a manner to be infuenced by the random variation of daily data. Meanwhile, Equations (2) and (3) can be rewritten as follows:

$$\hat{P}_k(l) = (1-a)\hat{P}_k(l-1) + aP_k(l) \quad (4)$$

$$\hat{P}_k(0) = P_k(0) \quad (5)$$

In accordance with the above Equation (4), there is the advantage that the weighted average of Equation (2) can be calculated without storing the observation values $P_k(i)$ ($i=1, 2, \ldots, l-1$) of the average demands in the past.

It is noted, however, that even though the foregoing representative value $P_k$ ($k=2, 3, \ldots, K$) of the average demand of each time zone has been precisely estimated, the deviation thereof from the actual demand becomes large near the demarcating boundary time $t_k$ ($k=2, 3, \ldots, K$) when the boundary time $t_k$ itself is incorrectly set. This large deviation brings about the disadvantage that the predicted calculations of the waiting times, the possibility of the full capacity, etc. become erroneous, so the elevators are not group-supervised as intended.

SUMMARY OF THE INVENTION

This invention is aimed to overcome the disadvantage described above, and has for its object to provide a demand estimatiohn apparatus wherein the temporary boundary times of sections set from the demands of a next cycle are determined and compared with the estimated boundary times for the corresponding sections at the end of a previous cycle such that the total demands in all the sections of the next cycle have substantially the same predetermined relationship, whereby the demand can be estimated at high precision.

In order to achieve the above and other objects, the present invention provides a demand estimation apparatus wherein each cycle of a demand fluctuating substantially cyclically is divided into a plurality of sections, a demand estimation apparatus comprising first means for determining temporary boundary times of the plurality of sections of a current cycle on the basis of measured demands obtained during the current cycle and estimated demands from a previous cycle such that the total demands in all the sections have a predetermined relationship, and second means for setting estimated boundary times of sections of a next cycle by correcting the estimated boundary times provided by said second means for the corresponding sections at the end of the previous cycle in accordance with the temporary boundary times of the corresponding sections of the current cycle determined by said first means such that the total demands in all the sections of the next cycle have substantially the same predetermined relationship, whereby the estimated boundary times and the demands within the sections defined by the estimated boundary times of a cycle are provided for controlling machines.

DESCRIPTION OF THE PREFERRED EMBODIMENT

An embodiment of the present invention will now be described with reference to FIGS. 1 to 9.

Figure 1:
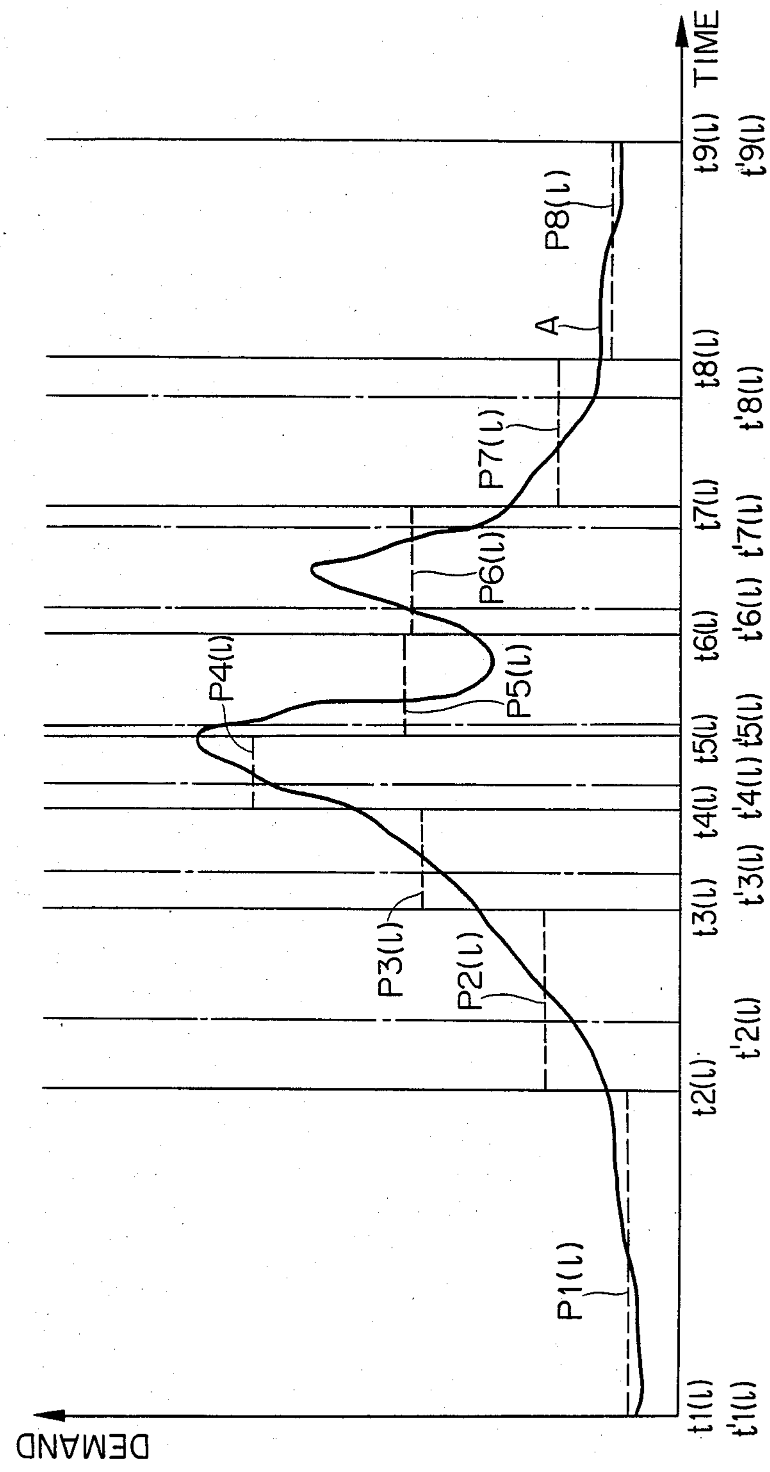
FIG. 1 is a demand diagram showing the variation in the traffic volume of an elevator.

Referring to FIG. 1, there will be first described the outline of a procedure in which the estimated boundary times of sections of a next cycle are corrected in accordance with the temporary boundary times of the corresponding sections of the current cycle.

In the figure, A denotes an l-th demand curve $t_1(l)$–$t_9(l)$ denote a demarcating boundary time on the l-th day preset by calculation before the l-th day, $t'_1(l)$–$t'_9(l)$ denote demarcating boundary times of the corresponding sections set on the basis of the demand on the l-th day, and $P_1(l)$–$P_8(l)$ denote an average demand on the l-th day between the section 1 and the section 8.

In this example, the demands have been determined based on the previous calculation of demands in the eight sections at the boundary times of $t_1(l)$–$t_8(l)$ on the l-th day. Here, when the average demands in the respective sections are expressed by $P_1(l)$–$P_8(l)$, the representative values $\hat{P}_1(l)$–$\hat{P}_8(l)$ which have been predicted by the Equation (4) can be obtained as described above.

It is noted that the predicted demand values determined above are not always apropriately used in the estimation for the next cycle. For example, in case of the demand curve A, it is considered to be preferable that the boundary times are $t'_2(l)$–$t'_8(l)$. This corresponds to the case that the sections are set so that total demands in the respective sections become substantially equal. The section setting means can be considered in various ways in addition to the above, but it is essential to preferably follow the features of the demand curve A.

However, while it is appropriate to set the boundary times to $t'_2(l)$–$t'_8(l)$ for the l-th day, it is not appropriate to set the boundary times on the $(l+1)$-th day the same as the boundary times $t'_2(l)$–$t'_8(l)$ of the l-th day because it is considered that the columns $t_k(1)$, $t_k(2)$, ... of the boundary times are irregular in the same manner that the columns $P_k(1)$, $P_k(2)$, ... of the average demand are irregular near the certain representative value $P_k$. Likewise, the boundary times can be estimated as follows:

$$\hat{t}_k(l)=(1-b)\hat{t}_k(l-1)+b\hat{t}_k(l) \tag{6}$$

$$\hat{t}_k(0)=\hat{t}_k(0) \tag{7}$$

Here, $\hat{t}_k(l)$ denotes the representative value of the boundary time estimated from the demand which has been measured up to the l-th day, and $t_k(0)$ denotes an initial value, and b denotes a parameter in case of $0<b<1$. When this is applied to FIG. 1, the boundary times of the sections on the $(l+1)$-th day become as the following equation:

$$t_k(l+1)=(1-b)t_k(l)+bt'_k(l) \tag{8}$$

When $b=0.5$ is set, for example, the time average of $t_k(l)$ and $t'_k(l)$ becomes the boundary time of the section on the $(l+1)$-th day.

It is simple to set the $t_1(l)$ and $t_9(l)$ to be fixed values, and when the interval between the $t_1(l)$ and $t_9(l)$ is set to be just one day, the $t_1(l)$ may be a demand having a small time, and may ordinarily be zero time at midnight. In this case, it naturally becomes $t_9(l)=t_1(l+1)$.

In this manner, the sections can be suitably set, and the demand can be accurately estimated.

Figure 2:
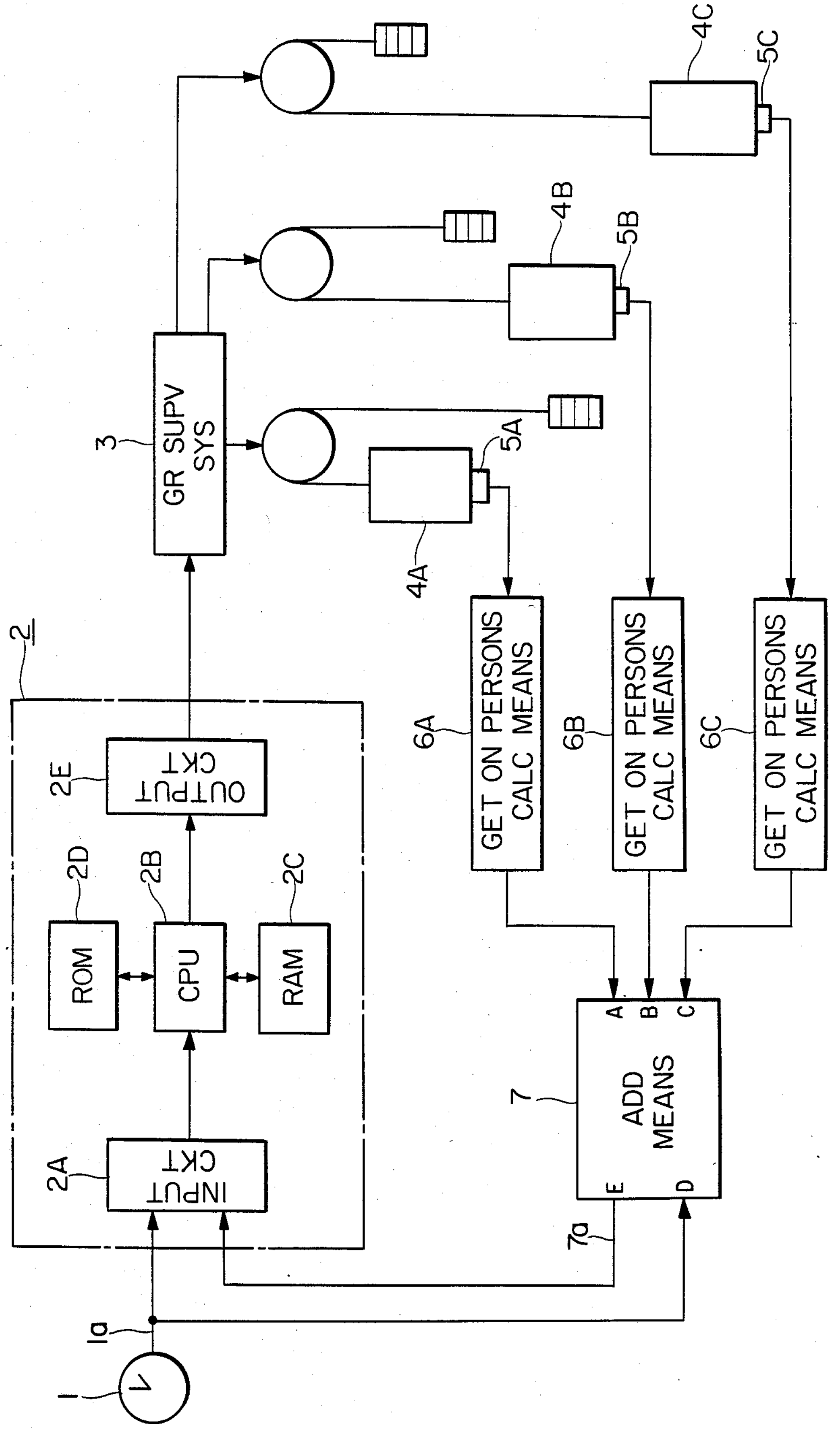
FIG. 2 is a block diagram showing an embodiment of a demand estimation apparatus according to the present invention.

In FIG. 2, numeral 1 designates clock means which produces a timing signal 1*a* each time the unit time DT (e.g., 5 minutes) lapses, numeral 2 designates control means which basically comprises an electronic computer such as microcomputer, wherein symbol 2A is an input circuit which is constructed of a converter for receiving an input, symbol 2B is a central processing unit (hereinbelow, termed "CPU"). symbol 2C is a random access memory (hereinbelow, termed "RAM") which stores data such as the operated results of the central processing unit 2B, symbol 2D is a read only memory (hereinbelow, termed "ROM") which stores programs and constant value data, and symbol 2E is an output circuit which is constructed of a converter for delivering signals from the CPU 2B. Numeral 3 designates a group supervisory system which group-supervises three elevator cages 4A, 4B and 4C in accordance with signals from the control means 2 and which can, for example, as disclosed in U.S. Pat. No. 4,244,450, employ number-of-persons detection means indicated by symbols 5A, 5B and 5C which are respectively provided in the cages 4A, 4B and 4B and produce signals proportional to the number of persons. Symbols 6A, 6B and 6C designate number-of-getting-on-persons calculation means for storing the minimum value of input signals when doors are open, subtracting the minimum value from the value of the input signal when the doors are closed and calculating the number of persons who have gotten on the cages 4A, 4B and 4C, as taught in U.S. Pat. No. 4,044,860. Numeral 7 designates addition means which adds the inputs A, B and C, cumulates the inputs D for the unit time DT, and outputs as the number-of-getting-on-persons signal 7*a* the cumulated value on the basis of a timing signal 1*a* and simultaneously starts the cumulating operation of the next time unit.

Figure 3:
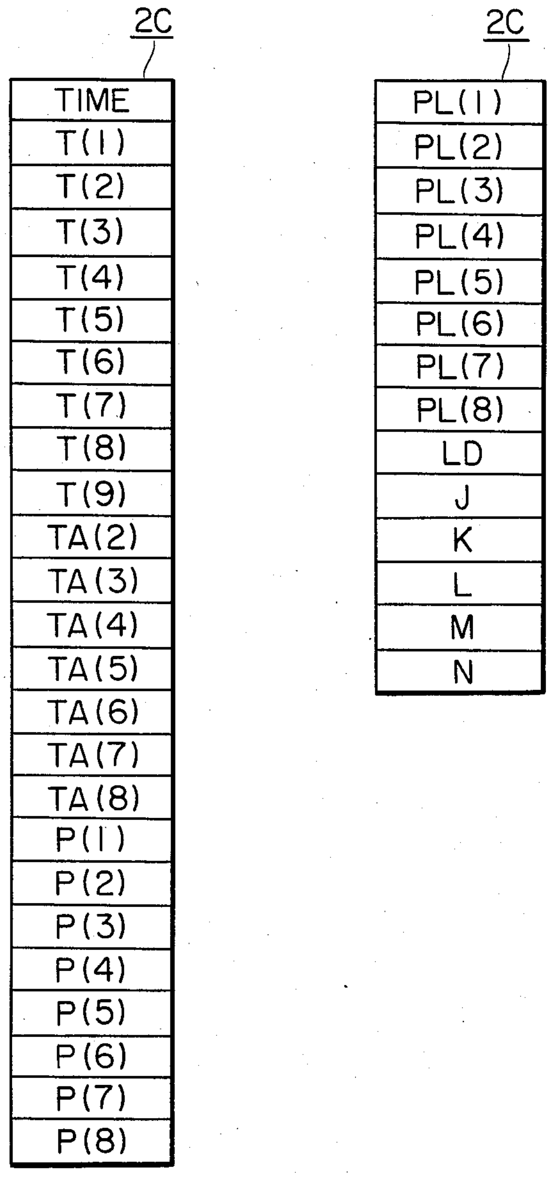
FIG. 3 is a diagram showing the content of RAM in FIG. 2.
Figure 4:
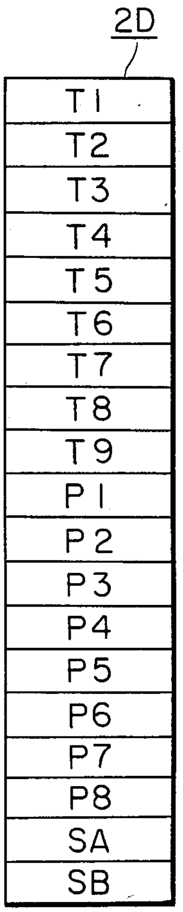
FIG. 4 is a diagram showing the content of ROM in FIG. 2.

In FIGS. 3 and 4, symbol TIME indicates a time obtained from the timing signal 1*a*, symbols T(1)–T(9) estimated boundary times, symbols TA(2)–TA(8) temporary boundary times determined from the demand on that day, P(1)–P(8) average demands in the sections 1–8 respectively, PL(1)–PL(8) predicted average demands which correspond to the representative value $\hat{P}_k(l)$ in the sections 1–8 respectively (k=1–8), symbol LD a demand which corresponds to the number-of-getting-on-persons signal 7*a*, and symbols J–N counters used for variables which indicate the sections. These data are stored in the RAM(2C). Symbols T(1)–T(9), which are set at 0 (=0: 00), 96 (=8: 00), 108 (=9: 00), 132 (=11: 00), 144 (=12: 00), 156 (=13: 00), 204 (=16: 00), 216 (=18: 00) and 288 (=24: 00), respectively, P1–P8 the initial values of the predicted average demands PL(1)–PL(8), which are set at 5, 80, 40, 60, 80, 30 and 5 (passengers/5 minutes), respectively, symbol SA a parameter corresponding to the parameter a in Equation (4) set at a value 0.2, and symbol SB a parameter corresponding to the parameter b in Equation (6) set at a value 0.2. These data are stored in the ROM(2D).

Figure 5:
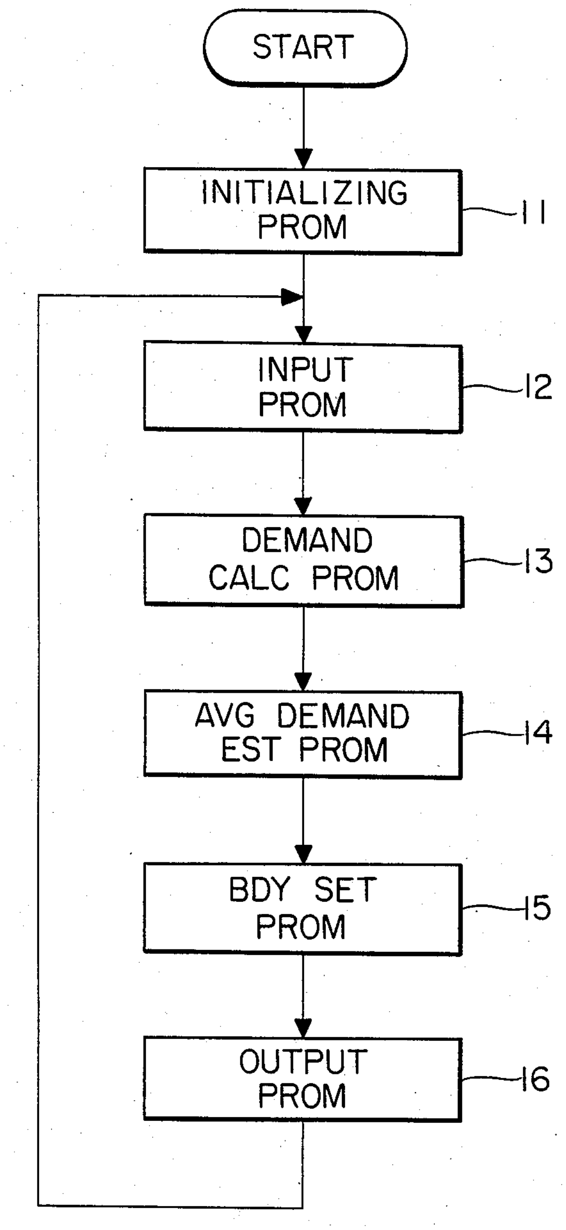
FIG. 5 is a diagram showing the general flow of programs.
Figure 6:
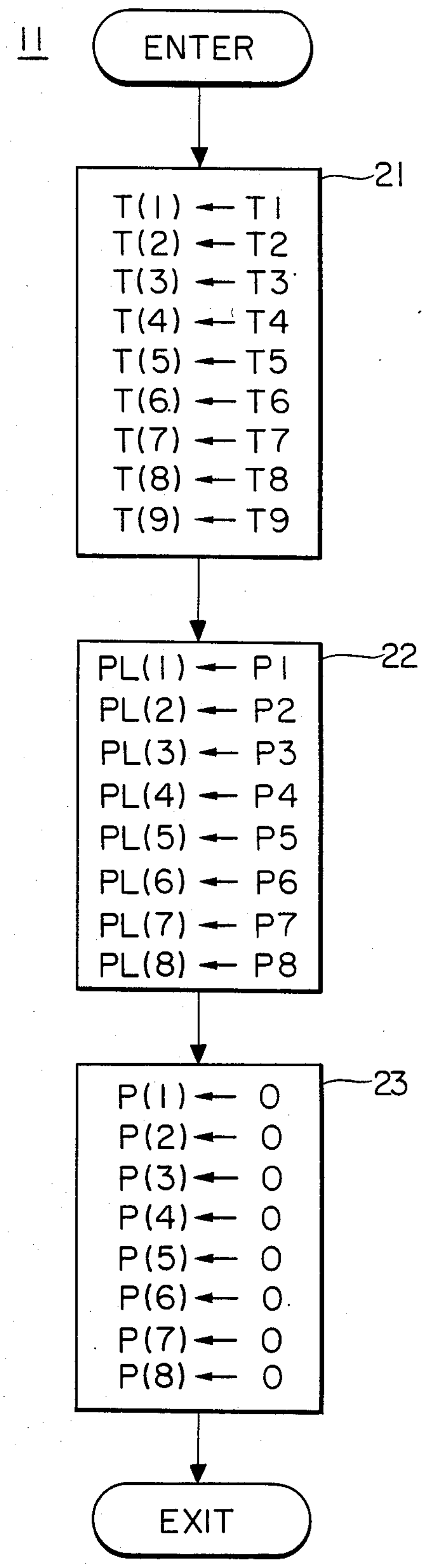
FIG. 6 is a diagram showing the flow of the operation of an initializing program in FIG. 5.
Figure 7:
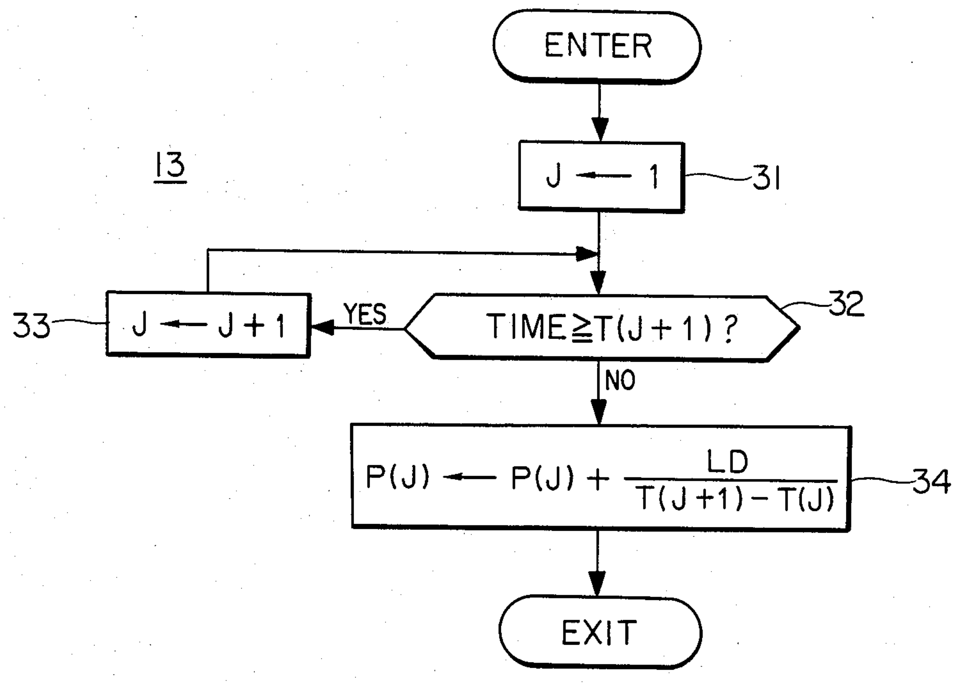
FIG. 7 is a diagram showing the flow of the operation of a demand calculating programs.
Figure 8:
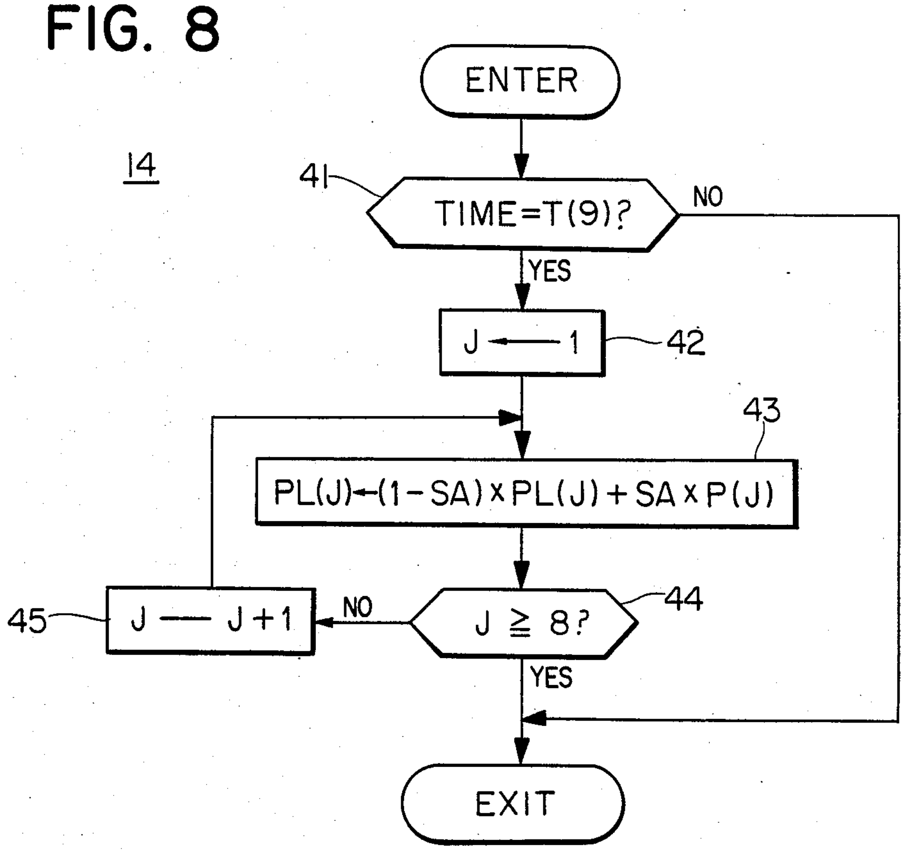
FIG. 8 is a diagram showing the flow of the operation of an average demand estimating program.
Figure 9:
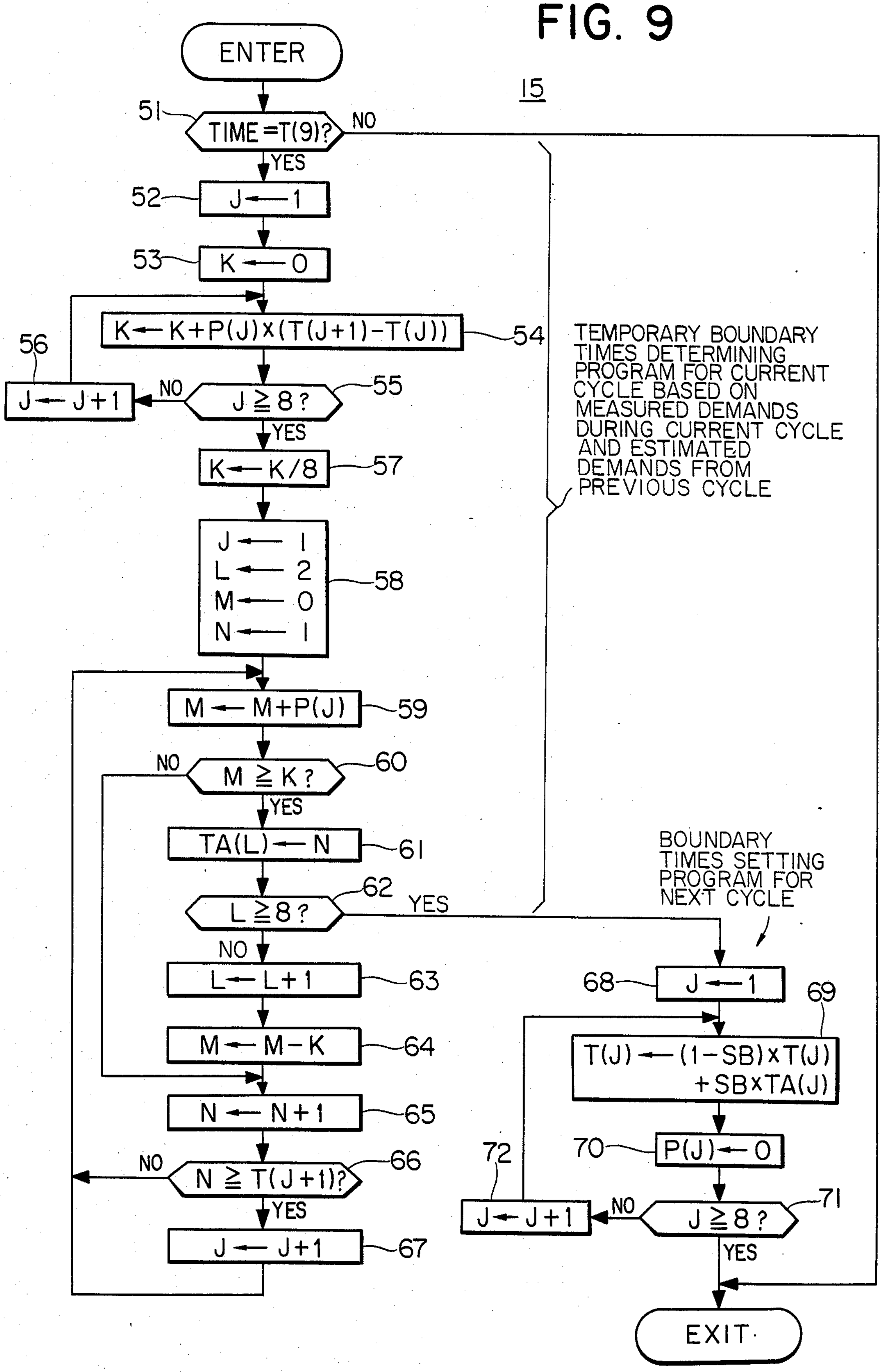
FIG. 9 is a diagram showing the flow of the operation of a boundary setting programs.

In FIG. 5, numeral 11 designates an initializing program for setting the initial values of various data, numeral 12 an input program which accepts signals from the input circuit 2A and sets them in the RAM 2C, numeral 13 a demand calculating program which calculates the average demands P(1)–P(8) measured in the corresponding sections 1–8, numeral 14 an average demand estimating program which calculates the predicted average demands PL(1)–PL(8) in the respective sections 1–8, numeral 15 a boundary setting program which corrects the boundaries T(2)–T(8) of the respective sections 1–8, numeral 16 an output program which transmits the predicted average demands PL(1)–PL(8) from the output circuit 2E, in FIG. 6, numerals 21–23 are the operating sequences of the initializing program 11, in FIG. 7, numerals 31–34 are the operating sequences of the demand calculating program 13, in FIG. 8, numerals 41–45 are the operating sequences of the demand estimating program, and in FIG. 9, numerals 51–72 are the operating sequences of the boundary setting program 15.

The operation of this embodiment of the demand estimation apparatus constructed as thus far described operates as follows.

The number-of-persons detection means 5A–5C produce signals proportional to the number of persons who have gotten on the cages 4A–4C, respectively, and the number-of-getting-on-persons calculation means 6A–6C calculate the number of persons who have gotten on the cages 4A–4C, respectively. The respective numbers of the persons who have gotten on the cages are added, whereupon the number-of-getting-on-persons signal 7*a* is produced, and sent to the input circuit 2A. Simultaneously therewith, the number of counts produced when the value 1 is counted every 5 minutes since a time 0 o'clock is provided as the timing signal 1*a* from the clock means 1, and it is inputted to the input circuit 2A.

On the other hand, when the control means 2 is first connected to a power source, the initializing program 11 is actuated. More specifically, the initial values T1–T9 are respectively set for the estimated boundary times T(1)–T(9) at Step 21. Subsequently, at Step 22, the initial values PL1–PL8 are respectively set for the predicted average demands PL(1)–PL(8). Next, when the average demands P(1)–P(8) are reset to 0 at Step 23, the control flow shifts to the input program 12.

The input program 12 is a well-known program which feeds the input signal from the input circuit 2A into the RAM 2C. By way of example, when the time is 8 o'clock, the input program reads the value 96 from the input circuit 2A and shifts it so as to set the time TIME of the RAM 2C at 96. Likewise, when the number-of-getting-on-persons signal 7*a* is accepted, the value is set as the demand LD of the RAM 2C.

Next, the operations of the demand calculating program 13 will be explained. At Step 31, the counter J is set to 1. When the time TIME is larger than the boundary time T(J+1) at Step 31, the control flow proceeds to Step 33, at which the counter J is increased by 1, and the control flow returns again to Step 32. When the time TIME is smaller than the boundary time T(J+1), the control flow proceeds to Step 34. Here, the average demand P(J) of the section J is corrected by the use of the demand LD measured anew, so as to increase to the amount of the demand per unit time DT as denoted by the up LD/[T(J+1)−T(J)]. In this manner, the demand of the section which corresponds to the time is added and calculated so as to calculate the average demand P(J) per unit time DT.

Next, the operations of the average demand estimating program 14 will be explained. Only when the time TIME arrives at the estimated boundary time T(9) which is the end time of the section 8 indicated by Step 41, the following steps 42–45 are executed. After the counter J is initialized to 1 at Step 42, the predicted average demand PL(J) calculated up to the previous cycle is multiplied by (1−SA) and is added to the average demand P(J) just observed on the current cycle multiplied by SA, to set a new values predictive average demand PL(J). The value of the counter J is judged at Step 44, and when it is smaller than 8, the counter J is increased by 1 at Step 45, and the calculation of Step 43 is repeated. Then, when the calculation executed for each section, is established, the program is shifted to the next operation.

Next, the operations of the boundary setting program 15 will be explained. When, at Step 51, the time TIME has reached the estimated boundary time T(9) which is the end time of the section 8, the control flow proceeds to Step 52, at which time the counter J is set to 1. Subsequently, at Step 53, the counter K is set to 0. At Step 54, the total demand of the section J is calculated by multiplying the average demand per unit time by the length of the section. At Steps 55 and 56, the Step 54 is executed until the counter J becomes 8, and the above calculation is cumulated in the counter K. Therefore, while the control flow proceeds from Step 55 to Step 57, the counter J calculates the sum of the total demand from 1 to 8 and the counter K accordingly calculates the total demand in one cycle. At Step 57, the value is divided by 8, and is again applied to the counter K. More specifically, the average section total demand is applied to the counter K. After the counters J, L, M and N are respectively set to 1, 2, 0 and 1 at Step 58, the control flow proceeds to Step 59, and the average demand P(J) of the section J is added in the counter M. Then, when the counter M has not yet arrived at the average section total demand K at Step 60, the counter N is increased by 1 at Step 65, and the control flow returns to Step 59 until the counter N arrives at the boundary time T(J+1) at Step 66. When the counter M has arrived at the average section total demand K at Step 60, the control flow proceeds from Step 60 to Step 61, and the value of the counter N is applied as the temporary boundary time TA(L). Since the counter L is initially set to 2 at Step 58, the temporary boundary time TA(2) is thus determined in this fashion. When the counter L is smaller than 8 at Step 62, the counter L is increased by 1 at Step 63. Then, the counter K is subtracted from the counter M at Step 64, and the counter N is increased by 1 at Step 65. When, at Step 66, the counter N has arrived at the boundary time T(J+1), the counter J is increased by 1 at Step 67, and the control flow returns to Step 59. In this manner, the average demand P(J) of the next section is added to the counter M at Step 59.

In this manner, when the time N has arrived at the boundary time T(J+1), the average demand P(J) of the next section is added. When the cumulation of the average demand P(J) has arrived at the average section total demand, the time N which corresponds to it is set as the temporary boundary time TA(L). When L=8 is established, all have been decided (since the TA(9) is fixed at 24 o'clock), and the control flow accordingly proceeds from Step 62 to Step 68. The computer operating under the program sequence including steps 52–67 constitutes a first means for setting the boundary times of all the sections on the basis of measured demands such that the total demands in all sections have a predetermined relationship, i.e., are equal.

Furthermore, second means are provided for estimating the boundary times for the next cycle, including the steps 68–72 after step 67. Thus, after setting temporary boundary times at Step 68, the counter J is set to 1, the boundary times are corrected at Step 69. More specifically, the sum of the estimated boundary time T(J) multiplied by (1−SB) and the temporary boundary time TA(J) multiplied by SB is applied to a new boundary time T(J). For example, it is assumed that the boundary time TA(J) is 101 (which corresponds to 8: 25) and the boundary time T(J) so far as 96 (which corresponds to 8: 00), the new boundary time T(J) for SB=0.2 is established:

$$T(J)=(1-0.2)\times 96+0.2\times 101=97$$

Thus, the boundary time is displaced by 5 minutes. After, at Step 70, the average demand P(J) is reset to 0 to determine estimated demands for the next cycle, Steps 69 and 70 are repeated till the counter J becomes 8 at Steps 71 and 72. In this manner the estimated boundary times are established for the next cycle using the temporary boundary times TA(J) corrected to the new boundary times T(J) as the estimated boundary times.

The output program 16 produces the predicted average demand PL(J) of the respective sections divided by the boundary times obtained in this manner to the group supervisory system 3, which suitably group-supervises on the basis of the data, but the detail will be omitted.

In this example, the unit time DT has been set at 5 minutes, and the parameters a and b at 0.2 and 0.5, respectively. However, these parameters may respectively be set by the second means at values which conform with the content, properties, fluctuating magnitudes, etc. of the demand to be estimated, for example, the sections set for the present cycle based on the previous cycle and the sections set by said first means based on actual demand in the present cycle.

Also, even though in the above embodiments, the temporary boundary times TA(J) are determined for equally divided sections of the cycle, they can also be determined for sections of a cycle that are not equally divided.

Further, the sum of the number-of-getting on persons on all halls has been set as traffic demand, but it may be calculated and estimated at every floor or every direction, or the number of calls may be employed as the factor of the traffic demand.

Furthermore, it is to be understood from the foregoing embodiment that the invention is not limited to estimating the traffic volume of elevators, but that it is also applicable to the estimation of various demands such as electric power and water quantity.

Moreover, it is not necessary to obtain the new boundary time T(J) for the next cycle by the Equation (8), but the temporary boundary time TA(J) may be compared with the boundary time T(J), and the new boundary time T(J) for the next cycle obtained by simple means for moving the new boundary time toward the temporary boundary time TA(J) in response to the from the comparison. For example, when the temporary time TA(J) is different from the boundary time T(J) by more than 5 minutes, the boundary time T(J) may be moved always only for 5 minutes. Further, the boundary time T(J) is not necessarily shifted every cycle, but may be shifted moved once every few cycles.

As set forth above, according to the present invention, the boundary times of sections of each cycle set from the measured demands of that cycle are compared with the estimated boundary times which had been established during the previous cycle and corrected based on actual measured demands, and the corrected boundary times are used as the estimated boundary times of the sections of the next cycle. Therefore, the boundary times can be suitably shifted and the demands in the vicinity of the boundaries can be precisely estimated.

What is claimed is:

1. A demand estimation apparatus for controlling machines wherein each cycle of a substantially cyclically fluctuating demand is divided into a plurality of sections, said demand estimation apparatus comprising:

(a) first means for determining temporary boundary times of the plurality of sections of a current cycle on the basis of measured demands obtained during the current cycle and estimated demands from a previous cycle such that the total demands in all the sections have a predetermined relationship; and (b) second means for setting estimated boundary times of sections of a next cycle by correcting the estimated boundary times provided by said second means for the corresponding sections at the end of the previous cycle in accordance with the temporary boundary times of the corresponding sections of the current cycle determined by said first means such that the total demands in all the sections of the next cycle have substantially the same predetermined relationship, whereby the estimated boundary times and the demands within the sections defined by the estimated boundary times of a cycle are provided for controlling machines.

2. A demand estimation apparatus according to claim 1 wherein said second means shifts the estimated boundary times of said plurality of sections provided by said second means at the end of a previous cycle toward the boundary times of said corresponding sections by differing amounts to correspond with the determinations made by said first means, the differing amounts of shift being carried out by repeated displacements of a predetermined unit time.

3. A demand estimation apparatus according to claim 2 wherein said second means varies said predetermined unit time in response to the difference between the boundary times of the sections estimated at the end of a previous cycle and the temporary boundary times determined by said first means.

4. A demand estimation apparatus according to claim 3 wherein said second means comprises the estimated boundary times of the sections provided at the end of the previous cycle with the temporary boundary times of the sections set by said first means by respectively applying weights to said boundary times.

5. A demand estimation apparatus according to claim 1, further comprising time means for generating a timing signal at every predetermined unit time, and addition means for counting a demand for each said unit time whenever the timing signal is generated, said first means setting said temporary boundary times on the basis of outputs of said addition means.

6. A demand estimation apparatus according to claim 5 further including detection means provided on an elevator cage for detecting a number of people getting on said cage in a unit time and addition means for cumulating said number.

7. A demand estimation apparatus according to claim 5 wherein said addition means produces an output representing a demand counted between said timing signals for each said unit time.

8. A demand estimation apparatus according to claim 1 wherein said first means determines boundary times of sections of a current cycle so that the total demands in all sections have a predetermined relationship wherein the total demands become equal to each other.

9. A demand estimation apparatus according to claim 8 wherein said first means determines an average section demand by dividing a demand for one cycle by the number of sections, and said second means estimates boundary times of said sections for a next cycle so that the demands become equal to said average section demand.

* * * * *